United States Patent [19]

Shimizu et al.

[11] Patent Number: 5,473,539
[45] Date of Patent: Dec. 5, 1995

[54] ELECTRICALLY OPERATED POWER STEERING APPARATUS

[75] Inventors: Yasuo Shimizu, Minami-kawachi; Yoshito Nakamura, Utsunomiya; Shinzi Hironaka, Utsunomiya; Yoshinobu Mukai, Utsunomiya; Yoshiki Noro, Minami-nasu, all of Japan

[73] Assignee: Honda Giken Kogyo Kabushiki Kaisha, Tokyo, Japan

[21] Appl. No.: 164,884

[22] Filed: Dec. 10, 1993

[30] Foreign Application Priority Data

Dec. 11, 1992 [JP] Japan ............... 4-353189
Nov. 9, 1993 [JP] Japan ............... 5-279706
Nov. 11, 1993 [JP] Japan ............... 5-282782

[51] Int. Cl.$^6$ ........................... B62D 5/04
[52] U.S. Cl. ........................... 364/424.05; 180/79.1; 180/142; 74/388 PS
[58] Field of Search ........................... 364/424.05; 180/79.1, 180/141, 142; 73/862.08, 862.23, 862.321; 74/337, 388 PS; 318/434, 599; 388/821, 930

[56] References Cited

U.S. PATENT DOCUMENTS

| | | | |
|---|---|---|---|
| 4,509,611 | 4/1985 | Kade et al. | 180/79.1 |
| 4,653,601 | 3/1987 | Nakamura et al. | 180/79.1 |
| 4,715,461 | 12/1987 | Shimizu | 180/79.1 |
| 4,855,655 | 8/1989 | Shimizu | 388/820 |
| 4,946,001 | 8/1990 | Tanguchi et al. | 180/79.1 |
| 5,076,381 | 12/1991 | Daido et al. | 364/424.05 |
| 5,151,860 | 9/1992 | Taniguchi et al. | 364/424.05 |
| 5,198,981 | 3/1993 | Collier-Hauman et al. | 364/424.05 |
| 5,202,830 | 4/1993 | Tsurumiya et al. | 364/424.05 |
| 5,257,828 | 11/1993 | Miller et al. | 180/79.1 |
| 5,259,473 | 11/1993 | Nishimoto | 180/79.1 |

*Primary Examiner*—Kevin J. Teska
*Assistant Examiner*—Tan Q. Nguyen
*Attorney, Agent, or Firm*—Nikaido Marmelstein Murray & Oram

[57] ABSTRACT

An electrically operated power steering apparatus in a motor vehicle has a steering system for steering the motor vehicle, a steering torque detector for detecting a manual steering torque applied to the steering system, and an electric motor for generating an assistive torque to be transmitted as a steering assistive force to the steering system. An actual assistive torque detector detects an actual assistive steering torque which is actually transmitted from the electric motor to the steering system. A controller has at least a target assistive torque generator for generating a target value for an assistive torque to be generated by the electric motor depending on the manual steering torque detected by the steering torque detector, and generates a control signal based on the difference between the actual assistive steering torque detected by the actual assistive torque detector and the target value generated by the target assistive torque generator. The electric motor is energized by a motor driver based on the control signal from the controller.

15 Claims, 11 Drawing Sheets

$$\frac{vo}{vi} = \frac{\omega_0}{S+\omega_0} \qquad \omega_0 = \frac{1}{2\pi CR}$$

FIG. 9 (b)

$$\frac{vo}{vi} = \frac{S}{S+\omega_0} \qquad \omega_0 = \frac{1}{2\pi CR}$$

$$A = \frac{1}{J_M \cdot S^2 + D_M \cdot S + k_M}$$

$$B = \frac{K_M}{J_R \cdot S^2 + D_S \cdot S + k_M + k_S}$$

ELECTRICALLY OPERATED POWER STEERING APPARATUS

BACKGROUND OF THE INVENTION

1. Field of the Invention

The present invention relates to an electrically operated power steering apparatus on a motor vehicle which applies the drive torque of an electric motor as an assistive steering force directly to a steering system to reduce the manual steering force that the driver of the motor vehicle is required to exert to steer the motor vehicle.

2. Description of the Prior Art

Recent years have seen widespread use of electrically operated power steering apparatus which have an electric motor for applying an assistive steering torque to a steering system and control the drive force of the electric motor depending on the manual steering torque applied to the steering system for thereby reducing the manual steering force that the driver of a motor vehicle exerts to steer the motor vehicle.

It has been customary in the electrically operated power steering apparatus to control the output torque of the electric motor by supplying the electric motor with a target value in the form of a voltage or a current that is determined depending on the manual steering torque which is detected by a manual steering torque detector.

In the conventional electrically operated power steering apparatus, no consideration is given to the moment of inertia and viscosity resistance of the rotatable member of the electric motor. Therefore, if the moment of inertia and the viscosity resistance are of a large value, then large inertia and viscosity torques are imposed in a direction opposite to the torque generated by the electric motor. When the electric motor is started, it may produce a response delay in producing an assistive torque due to the inertial resistance thereof. When a countertorque from the tires is applied at the time no assistive torque is generated, since the rotational member of the electric motor is coupled to the rack, the moment of inertia of the electric motor is applied to the steering wheel. Therefore, no appropriate assistive torque can be achieved simply by supplying the electric motor with a target value in the form of a voltage or a current that is determined depending on the manual steering torque which is detected by a manual steering torque detector. As a result, the feel of steering action has been relatively poor with the conventional electrically operated power steering apparatus.

SUMMARY OF THE INVENTION

It is therefore an object of the present invention to provide an electrically operated power steering apparatus which prevents the feel of steering action from becoming poor because of the moment of inertia and viscosity resistance of the rotatable member of an electric motor.

According to the present invention, there is provided an electrically operated power steering apparatus in a motor vehicle, comprising a steering system for steering the motor vehicle, steering torque detecting means for detecting a manual steering torque applied to the steering system, an electric motor for generating an assistive torque to be transmitted as a steering assistive force to the steering system, actual assistive torque detecting means for detecting an actual assistive steering torque which is actually transmitted from the electric motor to the steering system, control means having at least target assistive torque generating means for generating a target value for an assistive torque to be generated by the electric motor depending on the manual steering torque detected by the steering torque detecting means, for generating a control signal based on the difference between the actual assistive steering torque detected by the actual assistive torque detecting means and the target value generated by the target assistive torque generating means, and motor driving means for energizing the electric motor based on the control signal from the control means.

The actual assistive torque detecting means may comprise means for detecting the actual assistive torque in an assistive torque transmission path in the steering system.

According to the present invention, there is also provided an electrically operated power steering apparatus in a motor vehicle, comprising a steering system for steering the motor vehicle, steering torque detecting means for detecting a manual steering torque applied to the steering system, target assistive torque generating means for generating a target assistive torque signal depending on the manual steering torque detected by the steering torque detecting means, an electric motor for generating an assistive torque to be transmitted as a steering assistive force to the steering system, actual assistive torque detecting means for detecting an actual assistive steering torque which is actually transmitted from the electric motor to the steering system based on at least a motor current of the electric motor, and motor driving means for energizing the electric motor based on respective output signals from the target assistive torque generating means and the actual assistive torque detecting means.

The assistive torque actually transmitted to the steering system may comprise a motor torque determined from the motor current and corrected based on a inertial resistance and a viscosity resistance of the electric motor.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
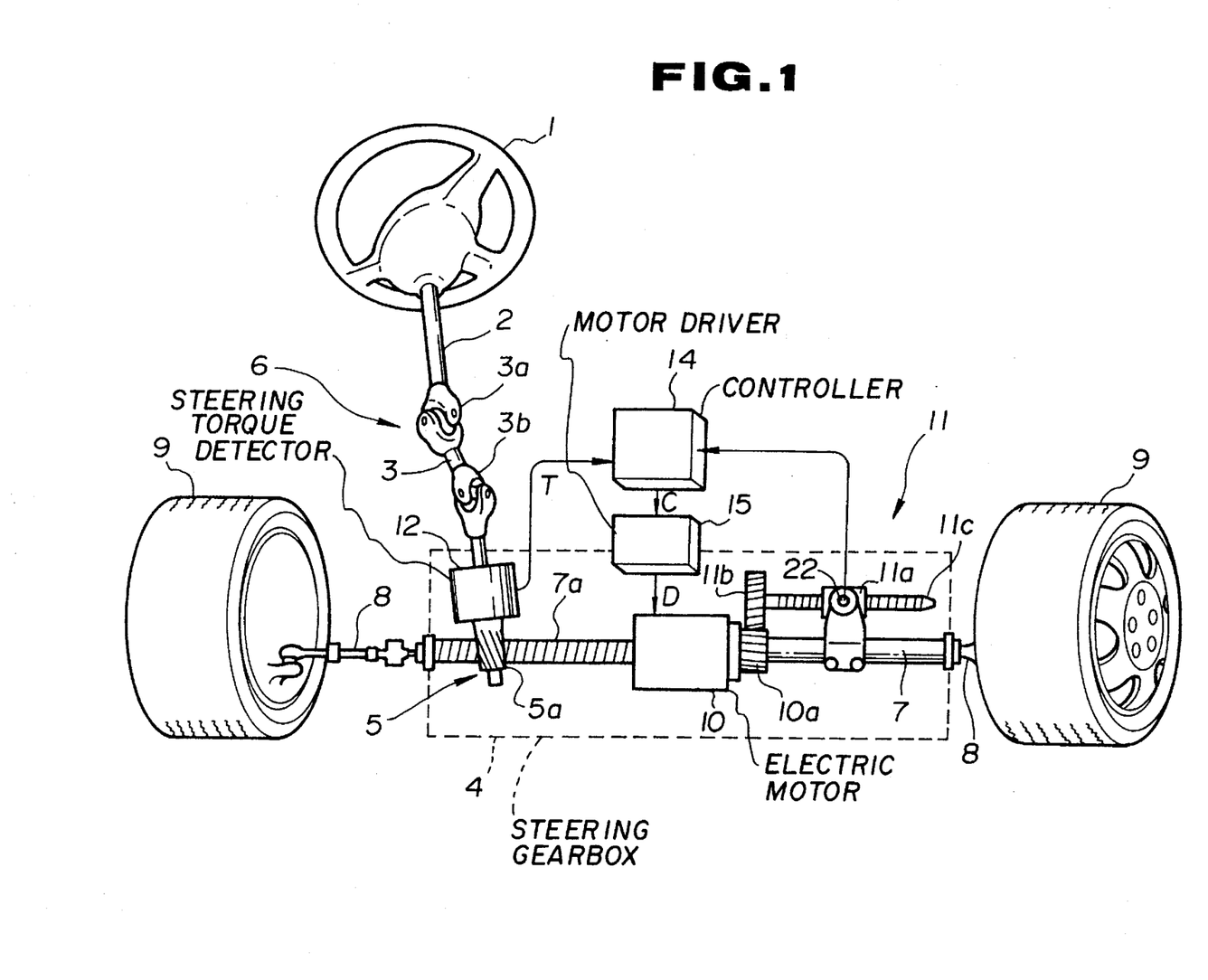
FIG. 1 is a schematic perspective view of an electrically operated power steering apparatus according to a first embodiment of the present invention.

As shown in FIG. 1, an electrically operated power steering apparatus according to a first embodiment of the present invention has a manual steering force generator 6 which comprises a steering wheel 1, a steering shaft 2 integrally coupled to the steering wheel 1, and a rack-and-pinion mechanism 5 disposed in a steering gearbox 4 and having a pinion 5a coupled to the steering shaft 2 through a joint shaft 3 having universal joints 3a, 3b on its opposite ends.

The steering gearbox 4 houses a rack shaft 7 having rack teeth 7a held in mesh with the pinion 5a, the rack shaft 7 being reciprocally movable when the pinion 5a is rotated. The rack shaft 7 is coupled through tie rods 8 to respective front wheels 9 that can be laterally turned or steered to steer the motor vehicle in which the electrically operated power steering apparatus is incorporated.

To reduce the manual steering force produced by the manual steering force generator 6, an electric motor 10 is mounted on the rack shaft 7 extending axially therethrough for supplying an assistive torque in the axial direction of the rack shaft 7. A ball screw mechanism 11 is operatively coupled to the rack shaft 7 by a nut 11a in the gearbox 4. The electric motor 10 comprises a hollow rotor through which the rack shaft 7 extends, with a drive helical gear 10a being fixed to the hollow rotor. The ball screw mechanism 11 has a screw shaft 11c extending parallel to the rack shaft 7 and supporting a driven helical gear 11b on an end thereof, the driven helical gear 11b meshing with the drive helical gear 10a. The electric motor 10 can therefore apply an assistive torque through the ball screw mechanism 11 as a thrust force axially to the rack shaft 7.

The nut 11a is coupled to the rack shaft 7 through an actual assistive torque detector 22 for detecting an actual assistive torque from the thrust force applied from the nut 11a. The actual assistive torque detector 22 may be a pressure sensor comprising a resistance wire strain gage.

The steering gearbox 4 also houses a steering torque detector 12 for detecting a manual steering torque T applied from the steering shaft 2 to the pinion 5a. The steering torque detector 12 outputs a signal indicative of the manual steering torque T to a controller 14. In response to the torque signal (T), the controller 14 supplies a control signal C to a motor driver 15 which includes a drive signal generator 21 (see FIG. 2). The drive signal generator 21 generates and outputs a motor drive signal D to the electric motor 10 to energize the electric motor 10, which then outputs an assistive torque.

In the first embodiment, the steering wheel 1 and the front wheels 9 are mechanically coupled to each other. A control signal produced by the controller 14 which processes the torque signal from the steering torque detector 12 is supplied through the motor driver 15 to the electric motor 10 to control the output torque of the electric motor 10 for assisting in the thrust force on the rack shaft 7 in the steering gearbox 4.

Figure 2:
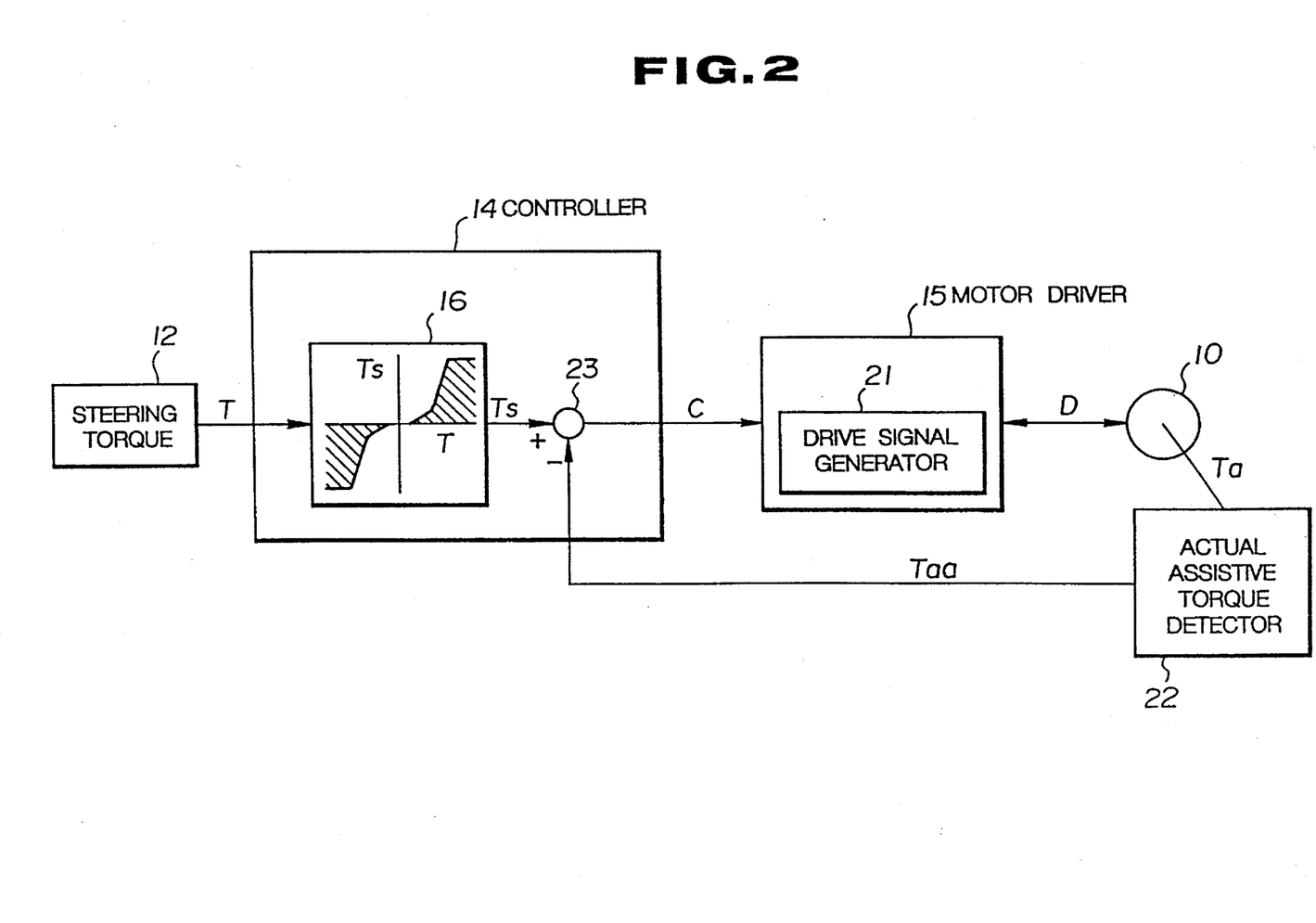
FIG. 2 is a block diagram of a control system of the electrically operated power steering apparatus shown in FIG. 1.

Operation of the electrically operated power steering apparatus according to the first embodiment will be described below with reference to FIG. 2.

A manual steering torque T applied from the steering wheel 1 is converted into a torque signal (T) by the steering torque detector 12 and the torque signal (T) is supplied to the controller 14. In response to the torque signal (T), a target torque generator 16 in the controller 14 generates and outputs a target assistive torque signal (Ts) corresponding to a target assistive torque for the electric motor 10 based on the torque signal (T). More specifically, the target torque generator 16 has a map having a data area which stores target assistive torques Ts addressable by the manual steering torque T. When the torque signal (T) is supplied, the target torque generator 16 instantaneously reads a corresponding assistive torque Ts from the map and outputs the assistive torque Ts.

If the electric motor 10 comprises a DC motor, then an actual assistive torque Ta outputted from the electric motor 10 is generally expressed by the following equation (1):

$$Ta = kT_M^* I_M - J_M^* \Theta_M'' - D_M^* \Theta_M' \pm T_f \qquad (1)$$

where $kT_M$ is the torque constant of the electric motor, $J_M$ the moment of inertia of the electric motor, $D_M$ the viscosity (damping) coefficient, $I_M$ the current of the electric motor, $\Theta_M''$ the rotational angular acceleration of the electric motor, $\Theta_M'$ the rotational angular speed of the electric motor, and $T_f$ the Coulomb friction torque.

The actual assistive torque detector 22 detects an actual assistive torque Taa at the joint between the nut 11a and the rack shaft 7 in an assistive torque transmission path from the electric motor 10 to the front wheels 9. The actual assistive torque Taa is given by:

$$Taa = Kb * Ta \quad (2)$$
$$= Kb \, (kT_M{}^*I_M - J_M{}^*\theta_M{}'' - D_M{}^*\theta_M{}' \pm T_f)$$

where Kb is a thrust conversion coefficient of the gears and the ball screw mechanism.

The difference ΔT between the target assistive torque Ts and the actual assistive torque Taa is calculated by a difference calculator 23, and the controller 14 gives a feedback gain multiplied by K to the motor driver 15 to control the output torque of the electric motor 10 so that the difference ΔT (=Ts−Taa) is eliminated, for thereby substantially equalizing actual assistive torque Taa to the target assistive torque Ts.

Heretofore, since the assistive torque Ta is determined based on the difference between the steering torque and the motor current signal, the second and following terms on the right-hand side of the equation (1) are not taken into consideration, and the output power of the electric motor 10 is controlled as if Taa=$kT_M{}^*I_M$. Generally, $D_M$ and $T_f$ are very small, but $J_M$ cannot be neglected. Specifically, if the weight of the motor vehicle is increased and so is the assistive torque for steering the motor vehicle, then a large output power is required from the electric motor 10, and hence the size of the electric motor 10 and $J_M$ are increased. From the equation (1), when the electric motor 10 is started, the rotational angular acceleration $\theta_M{}''$ of the electric motor 10 is increased and the actual output torque thereof is reduced, resulting in a delay in producing an assistive torque Ta. When no assistive torque Ta is produced ($I_M$=0), a countertorque or a counterforce from the tires is transmitted through the rack shaft 7 to the electric motor 10, which produces a rotational angular acceleration $\theta_M{}''$. Since a reactive torque (Td=$-J_M{}^*\theta_M{}''$) caused by the moment of inertia of the electric motor 10 is applied to the steering wheel 1 in addition to usual reactive forces from the tires, the feel of steering action is impaired. The electrically operated power steering apparatus according to the first embodiment of the present invention, however, eliminates the above drawbacks because its control process takes into account the moment of inertia, viscosity torque, and Coulomb friction torque of the electric motor 10, as described above.

An electrically operated power steering apparatus according to a second embodiment of the present invention will be described below. In the second embodiment, the actual assistive torque detector 22 does not physically detect an actual assistive torque Taa, but an actual assistive torque estimator is used as an actual assistive torque detector to estimate an actual assistive torque Taa from a voltage $V_M$ across the electric motor 10 and a current $I_M$ flowing through the electric motor 10. More specifically, if the electric motor 10 is a DC motor, then the voltage $V_M$ across the electric motor 10 is generally expressed as follows:

$$V_M = L^*(dI_M/dt) + R_M{}^*I_M + ks^*\Theta_M{}' \quad (3)$$
$$\approx R_M{}^*I_M + ks^*\Theta_M{}'$$

where $R_M$ is the resistance of the electric motor, and ks the induced voltage constant.

From the equation (3), $$\theta_M{}' = (V_M - R_M{}^*I_M)/ks \quad (4)$$

and a rotational angular acceleration $\theta_M{}''$ can be determined by differentiating $\Theta_M{}'$ with respect to time.

Specifically, the voltage $V_M$ across the electric motor 10 is detected with a differential amplifier, and the current $I_M$ flowing through the electric motor 10 is detected with a current detector which may comprise a DC resistor or a Hall effect device in the motor driver 15. By substituting the detected voltage $V_M$ and current $I_M$ in the equations (1), (2), and (4), an actual assistive torque Taa can be estimated (the Coulomb friction torque ($T_f$) is neglected as it is very small) rather than being physically detected by the actual assistive torque detector 22.

If the damping term ($D_M$) and the friction torque term ($T_f$) in the equation (1) are sufficiently small, they may be omitted, making the equation (1) simpler.

The moment of inertia and the damping coefficient may be set respectively to a moment of inertia including the tires and road wheels of the steering system and a damping coefficient for system stabilization for thereby improving the feel of steering action on the entire steering system.

The electrically operated power steering apparatus according to the first and second embodiments are capable of effectively compensating for a response delay in producing an assistive torque due to the resistance of rotational inertia of the electric motor when it is started, and the resistance of rotational inertia of the electric motor which is applied to the steering wheel when a countertorque is applied from the tires at the time no assistive torque is produced, with the result that the feel of steering action can be improved.

An electrically operated power steering apparatus according to a third embodiment of the present invention will be described below.

Figure 3:
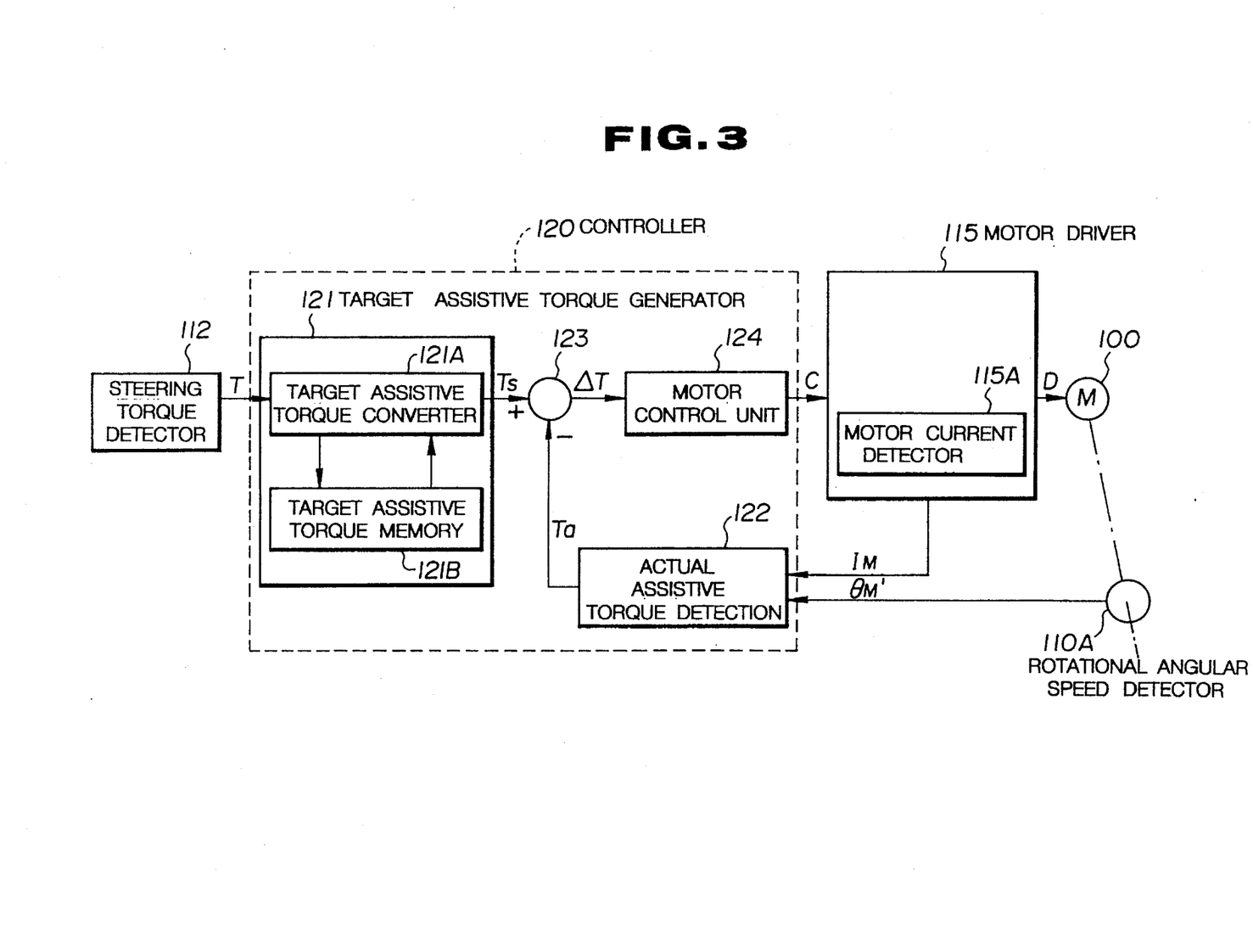
FIG. 3 is a block diagram of a control system of an electrically operated power steering apparatus according to a third embodiment of the present invention.

FIG. 3 shows in block form a control system the electrically operated power steering apparatus according to the third embodiment.

As shown in FIG. 3, the control system includes a steering torque detector 112 which may comprise a torque sensor or the like for detecting a steering torque applied from the steering wheel, a controller 120, a motor driver 115 having a motor current detector 115A, and a rotational angular speed detector 110A for detecting the rotational angular speed of an electric motor 100. The rotational angular speed detector 110A comprises a DC electric generator.

The controller 120 basically comprises a microprocessor, and includes a target assistive torque generator 121, an actual assistive torque detector 122, a subtractor 123, and a motor control unit 124. The controller 120 generates a target assistive torque signal (Ts) corresponding to a torque signal (T) detected by the steering torque detector 112, and also generates a control signal C based on the generated target assistive torque signal (Ts) and applies the control signal C to the motor driver 115 to enable the motor driver 115 to energize the electric motor 100 for producing a necessary assistive steering torque.

The controller 120 also calculates an actual assistive torque Ta corresponding to the assistive steering torque produced by the electric motor 100 based on a motor current $I_M$ detected by the motor current detector 115A and a rotational angular speed $\theta_M{}'$ detected by the rotational angular speed detector 110A, corrects the control signal C based on the difference (ΔT) between the target assistive torque signal (Ts) and the actual assistive torque signal (Ta), and outputs the corrected control signal C to control the electric motor 100 to equalize the actual assistive torque Ta to the target assistive torque Ts.

The target assistive torque generator 121 comprises a target assistive torque converter 121A and a target assistive torque memory 121B which may be a ROM or the like. The target assistive torque converter 121A converts a steering torque T detected by the steering torque detector 112 into an electric torque signal (T), also converts the torque signal (T) into a target assistive torque signal (Ts) stored in the target assistive torque memory 121B, and outputs the target assistive torque signal (Ts) to the subtractor 123.

The actual assistive torque detector 122 reads the motor current $I_M$ detected by the motor current detector 115A and the rotational angular speed $\theta_M'$ detected by the rotational angular speed detector 110A, converts the motor current $I_M$ and the rotational angular speed $\theta_M'$ into respective electric signals, process them as described later on into an actual assistive torque signal (Ta) representing the actual assistive torque corresponding to the assistive torque that is produced by the electric motor 10, and supplies the actual assistive torque signal (Ta) to the subtractor 123.

The subtractor 123 calculates the difference ($\Delta T = Ts - Ta$) between the target assistive torque signal (Ts) and the actual assistive torque signal (Ta), and outputs the calculated difference $\Delta T$ to the motor control unit 124.

In response to the supplied difference $\Delta T$, the motor control unit 124 outputs a control signal C, e.g., a pulse-width-modulated (PWM) signal, to the motor driver 115, which may comprise a bridge circuit composed of four FETs.

The motor driver 115 converts the control signal C into a motor drive current (motor current $I_M$), and outputs a motor drive signal D to energize the electric motor 100.

The motor current detector 115A of the motor driver 115 detects a motor current signal $I_M$, and supplies the motor current signal $I_M$ to the actual assistive torque detector 122.

Figure 4:
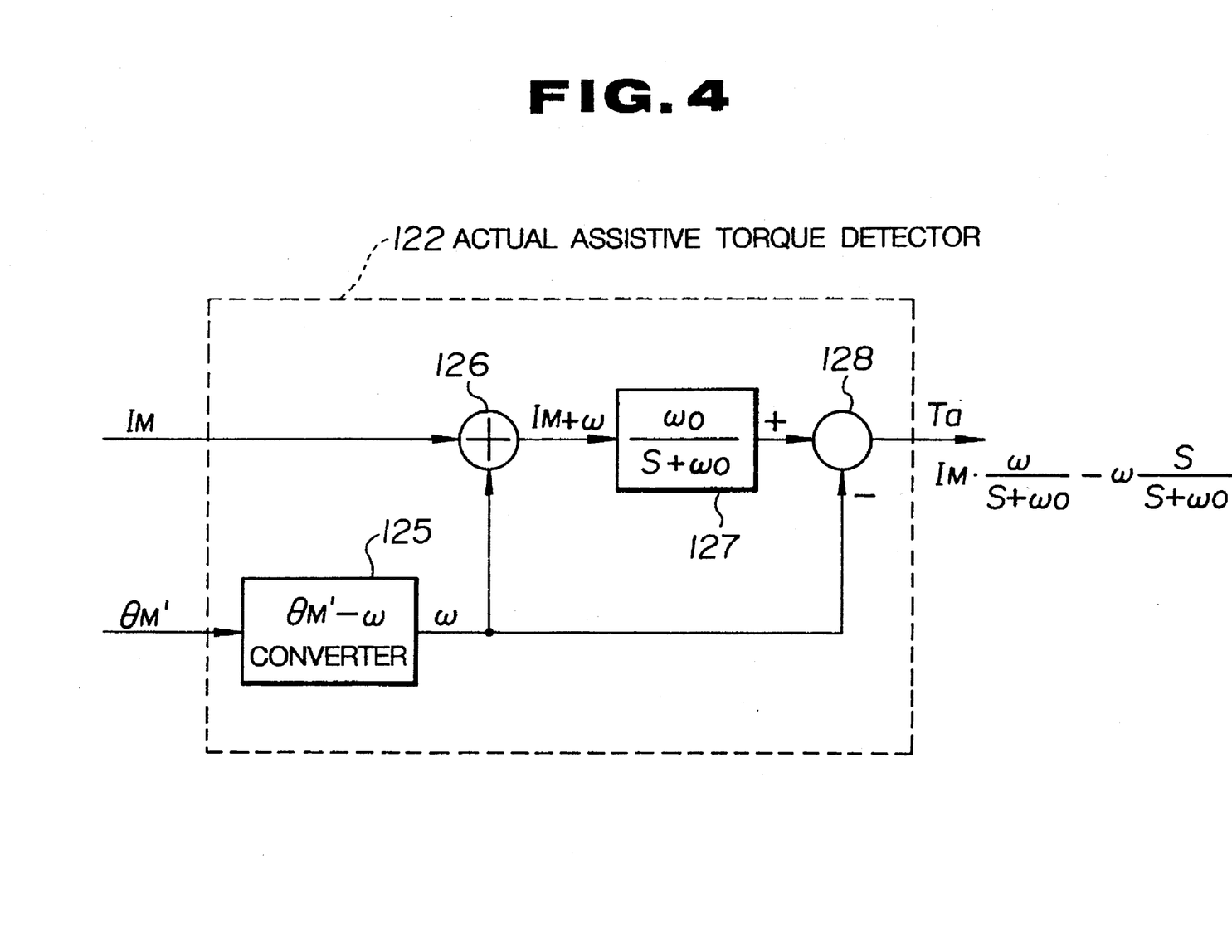
FIG. 4 is a block diagram of an equivalent circuit of an actual assistive torque detector of the electrically operated power steering apparatus shown in FIG. 3.

FIG. 4 shows an equivalent circuit of the actual assistive torque detector 122 in detail.

As shown in FIG. 4, the actual assistive torque detector 122 has a $\theta_M'$–$\omega$ converter 125 for converting the rotational angular speed $\Theta_M'$ detected by the rotational angular speed detector 110A into a corresponding angular frequency $\omega$ ($2\pi f$) as an electric quantity, an adder 126, a first-order low-pass filter 127 whose cutoff frequency is $f_0$ ($=\omega_0/2\pi$), and a subtractor 128. The actual assistive torque detector 122 calculates an actual assistive torque Ta based on the motor current $I_M$ and the rotational angular speed $\theta_M'$ according to the following equation (5):

$$Ta = I_M * \omega_0/(s+\omega_0) - \omega * s/(s+\omega_0) \quad (5).$$

In the equation (5), the first term of the right-hand side represents a current produced when the motor current $I_M$ passes through a low-pass filter and the second term of the right-hand side represents an angular frequency produced when the angular frequency $\omega$ passes through a high-pass filter.

Figure 9:
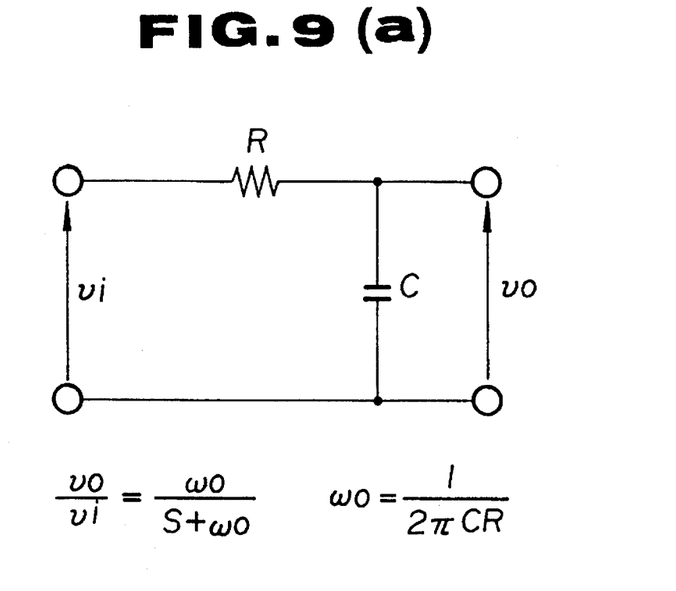
FIG. 9(a) is a circuit diagram of a low-pass filter composed of a resistor and a capacitor which can be used as the actual assistive torque detector of the electrically operated power steering apparatus shown in FIG. 3.
FIG. 9(b) is a circuit diagram of a high-pass filter composed of a resistor and a capacitor which can be used as the actual assistive torque detector of the electrically operated power steering apparatus shown in FIG. 3.

FIGS. 9(a) and 9(b) show respective first-order low- and high-pass filters each composed of a resistor R and a capacitor C.

In the equation (5), s represents the Laplace operator, $\omega_0/(s+\omega_0)$ and $s/(s+\omega_0)$ represent the transfer functions, respectively, of the low- and high-pass filters in the s region.

If the electric quantity $\omega$ is converted into the rotational angular speed $\theta_M'$ in the equation (5), since the transfer function $s/(s+\omega_0)$ is equivalent to differentiation in the time domain, the second term of the right-hand side of the equation (5) indicates the rotational angular acceleration $\Theta_M''$.

Therefore, the equation (5) can be modified into the following equation (6):

$$Ta = I_M * \omega_0/(s+\omega_0) - \theta_M'' \quad (6).$$

Comparison of the equations (6) and (1) shows that the first term of the right-hand side of each equation is proportional to the motor current $I_M$, the second term of the right-hand side of each equation is proportional to the rotational angular acceleration $\theta_M''$, and the terms of the right-hand side of the equation (6) can be equalized to the first and second terms of the right-hand side of the equation (1) by being multiplied by predetermined constants. Therefore, the actual assistive torque Ta which takes into account the inertia torque with respect to the motor torque can be produced by the equation (6).

Figure 5A:
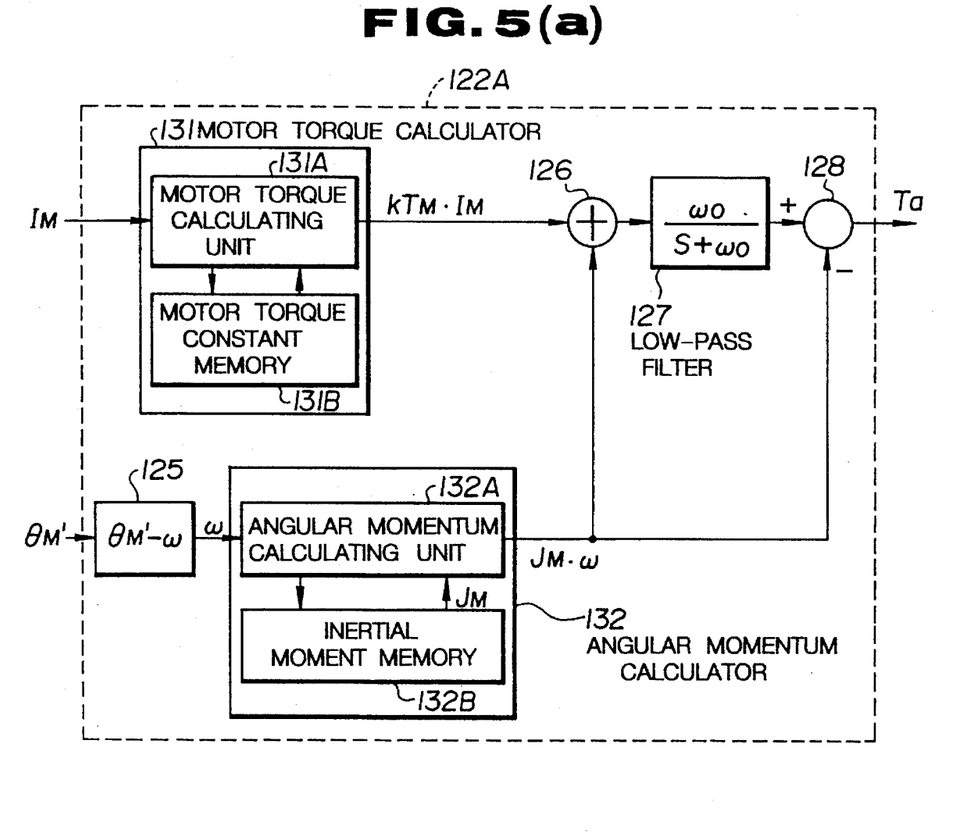
FIG. 5(a) is a block diagram of a first modification of the actual assistive torque detector of the electrically operated power steering apparatus shown in FIG. 3.
Figure 5B:
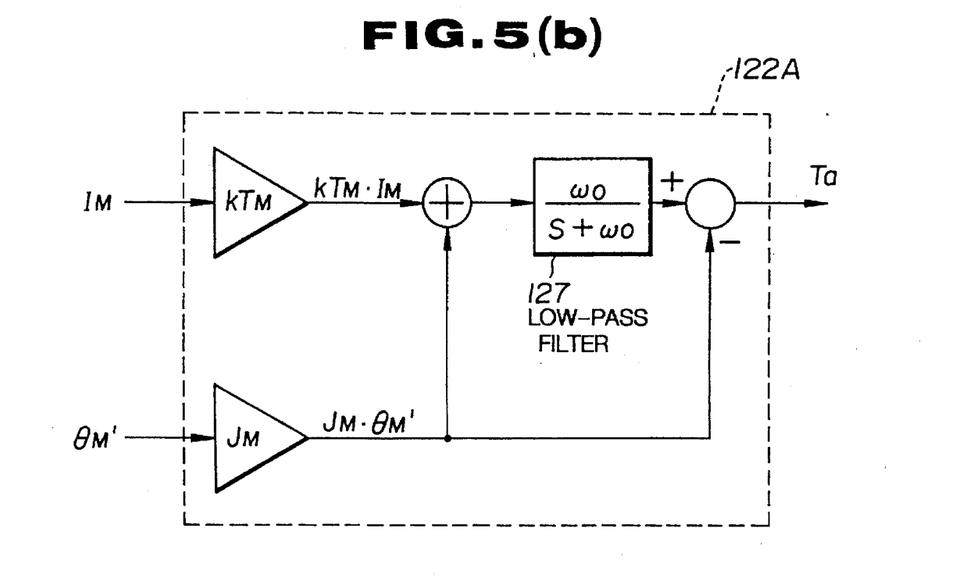
FIG. 5(b) is a block diagram of an equivalent circuit of the first modification of the actual assistive torque detector shown in FIG. 5(a)

FIGS. 5(a) and 5(b) show a first modification 122A of the actual assistive torque detector 122 and its equivalent circuit.

The first modification 122A of the actual assistive torque detector 122 illustrated in FIGS. 5(a) and 5(b) is equivalent to the product of a motor current $I_M$ and a motor torque constant $kT_M$ and the product of a rotational angular speed $\theta_M'$ and an inertial moment $J_M$.

The modified actual assistive torque detector 122A differs from the actual assistive torque detector 122 shown in FIG. 4 in that it additionally has a motor torque calculator 131 and an angular momentum calculator 132.

The motor torque calculator 131 has a motor torque calculating unit 131A and a motor torque constant memory 131B such a ROM or the like. The motor torque calculating unit 131A multiplies the motor current $I_M$ by a torque constant $kT_M$ stored in the motor torque constant memory 131B to produce a motor torque $kT_M * I_M$, and supplies a signal representing the motor torque $kT_M * I_M$ to the adder 126.

The angular momentum calculator 132 has an angular momentum calculating unit 132A and an inertial moment memory 132B such as a ROM or the like. The angular momentum calculating unit 132A multiplies the angular frequency $\omega$ ($2\pi f$) converted from the rotational angular speed $\theta_M'$ by an inertial moment $J_M$ stored in the inertial moment memory 132B to produce an angular momentum $J_M * \omega$, and supplies a signal representing the angular momentum $J_M * \omega$ to the adder 126.

The adder 126 adds the motor torque signal ($kT_M * I_M$) and the angular momentum signal ($J_M * \omega$), and supplies the sum to the low-pass filter 127. When the angular momentum signal ($J_M * \omega$) is subtracted from an output signal from the low-pass filter 127, an actual assistive torque Ta is produced which is expressed by the following equation (7):

$$Ta = kT_M * I_M * \omega_0/(s+\omega_0) - J_M * \omega * s/(s+\omega_0) \quad (7).$$

If the electric quantity $\omega$ is converted into the rotational angular speed $\theta_M'$ and $s/(s+\omega_0)$ is expressed in the time domain in the equation (7), then the second term of the right-hand side of the equation (7) becomes the product of the inertial moment $J_M$ and the rotational angular acceleration $\theta_M''$, resulting in the equivalent circuit shown in FIG. 5(b). Now, an actual assistive torque Ta according to the following equation (8) is obtained:

$$Ta = kT_M * I_M * \omega_0/(s+\omega_0) - J_M * \theta_M'' \quad (8).$$

The equation (8) is equivalent to the equation (1) up to the second term of the right-hand side thereof. Consequently, the arrangement shown in FIGS. 5(a) and 5(b) is capable of producing an actual assistive torque Ta which takes into account the inertia torque with respect to the motor torque.

Figure 6A:
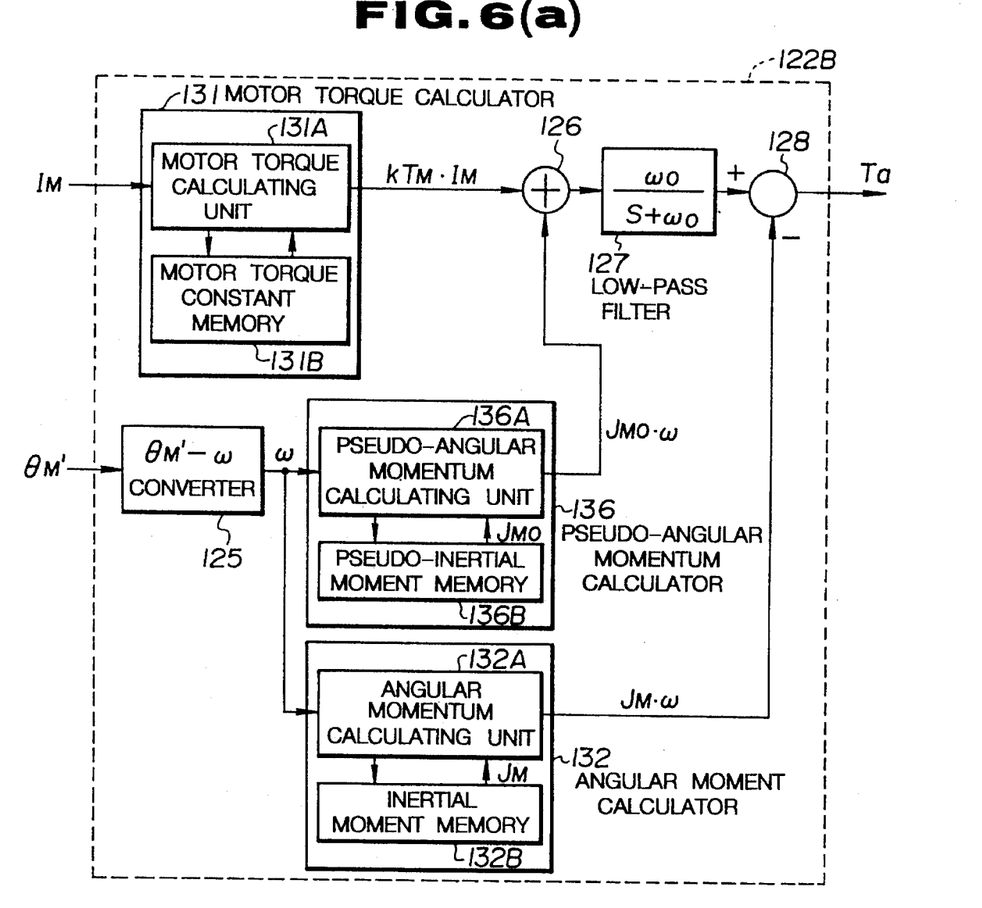
FIG. 6(a) is a block diagram of a second modification of the actual assistive torque detector of the electrically operated power steering apparatus shown in FIG. 3.
Figure 6B:
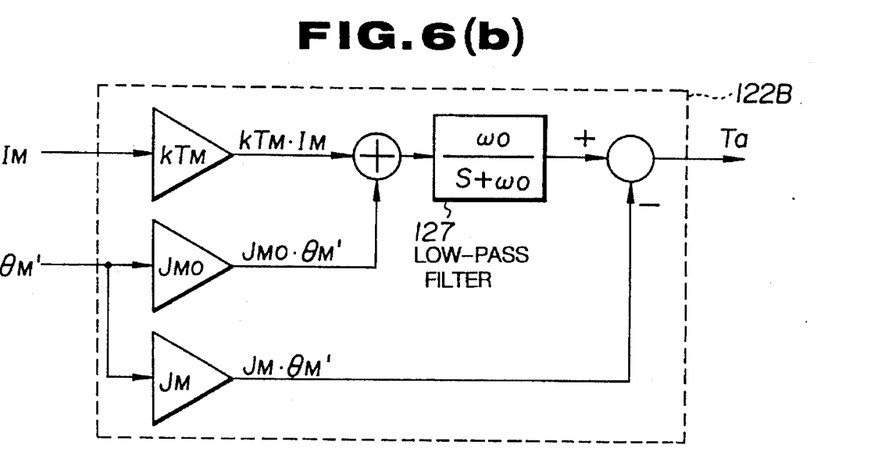
FIG. 6(b) is a block diagram of an equivalent circuit of the first modification of the actual assistive torque detector shown in FIG. 6(a)

FIGS. 6(a) and 6(b) show a second modification 122B of the actual assistive torque detector 122 and its equivalent circuit.

The modified actual assistive torque detector 122B differs from the actual assistive torque detector 122A shown in FIGS. 5(a) and 5(b) in that it additionally has a pseudo-angular momentum calculator 136 for supplying a pseudo-angular momentum signal ($J_{M0}*\omega$) to the adder 126.

The pseudo-angular momentum calculator 136 has a pseudo-angular momentum calculating unit 136A and a pseudo-inertial moment memory 136B such as a ROM or the like. The pseudo-angular momentum calculating unit 136A multiplies the angular frequency $\omega$ ($2\pi f$) converted from the rotational angular speed $\Theta_M'$ by a pseudo-inertial moment $J_{M0}$ stored in the pseudo-inertial moment memory 136B to produce a pseudo-angular momentum $J_{M0}*\omega$, and supplies a signal representing the pseudo-angular momentum $J_{M0}*\omega$ to the adder 126.

The adder 126 adds the motor torque signal ($kT_M*I_M$) and the pseudo-angular momentum signal ($J_{M0}*\omega$), and supplies the sum to the low-pass filter 127. When the pseudo-angular momentum signal ($J_{M0}*\omega$) is subtracted from an output signal from the low-pass filter 127, an actual assistive torque Ta is produced which is expressed by the following equation (9):

$$Ta = kT_M*I_M*\omega_0/(s+\omega_0) - J_M*\omega*s/(s+\omega_0) - (J_M - J_{M0})*\omega*\omega_0/(s+\omega_0) \quad (9).$$

If the electric quantity $\omega$ is converted into the rotational angular speed $\Theta_M'$ and $s/(s+\omega_0)$ is expressed in the time domain in the equation (9), then the second term of the right-hand side of the equation (9) becomes the product of the inertial moment $J_M$ and the rotational angular acceleration $\Theta_M''$, and the third term of the right-hand side thereof becomes the product of the difference ($J_{M0} - J_M$) between the pseudo-inertial moment $J_{M0}$ and the inertial moment $J_M$ and the rotational angular speed $\Theta_M'$, resulting in the equivalent circuit shown in FIG. 6(b). Now, an actual assistive torque Ta according to the following equation (10) is obtained:

$$Ta = kT_M*I_M*\omega_0/(s+\omega_0) - J_M*\Theta_M'' - (J_M - J_{M0})*\Theta_M'*\omega_0/(s+\omega_0) \quad (10).$$

If ($J_{M0} - J_M$) = $D_M$ (viscosity coefficient) in the equation (10), then the equation (10) is equivalent to the equation (1) up to the third term of the right-hand side thereof. Consequently, the arrangement shown in FIGS. 6(a) and 6(b) is capable of producing an actual assistive torque Ta which takes into account the inertia torque and the viscosity torque with respect to the motor torque.

$\omega_0/(s+\omega_0)$ in the first and third terms of the right-hand side of the equation (10) indicates the passage through the low-pass filter. Since the low-pass filter can attenuate harmonics of the rotational angular speed $\Theta_M'$ (electrically, the angular frequency $\omega$), it can attenuate noise which is produced by differentiation upon conversion from the rotational angular speed $\Theta_M'$ into the rotational angular acceleration $\Theta_M''$.

The actual assistive torque Ta calculated by the actual assistive torque detector 122, 122A, or 122B is a torque that is generated by the electric motor. Therefore, if the thrust conversion coefficient of the gears and the ball screw mechanism is represented by Kb, then an actual assistive torque Taa is expressed by the following equation (11):

$$Taa = Kb*Ta \quad (11).$$

Figure 7:
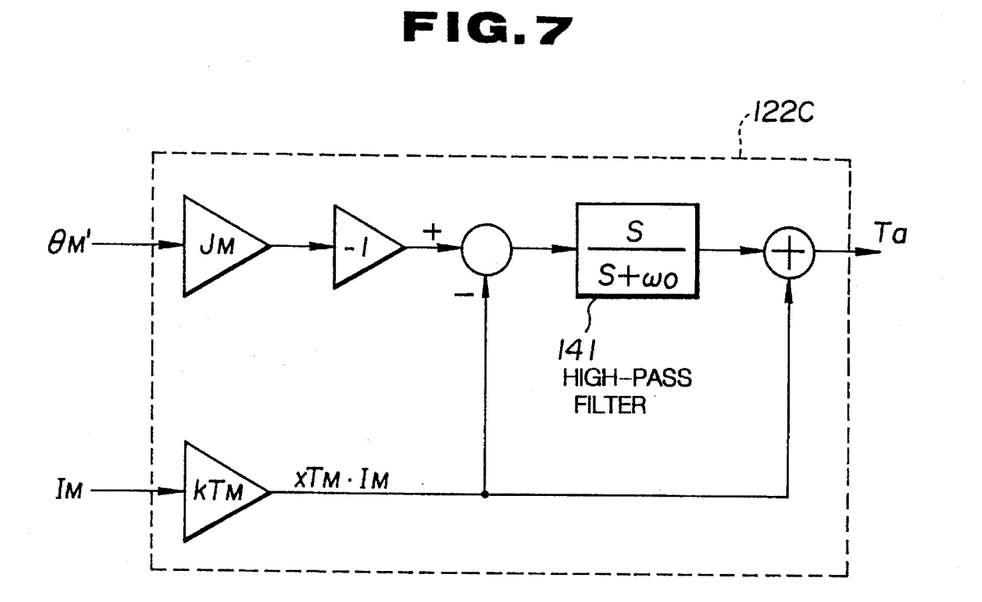
FIG. 7 is a block diagram of a third modification of the actual assistive torque detector of the electrically operated power steering apparatus shown in FIG. 3.
Figure 8:
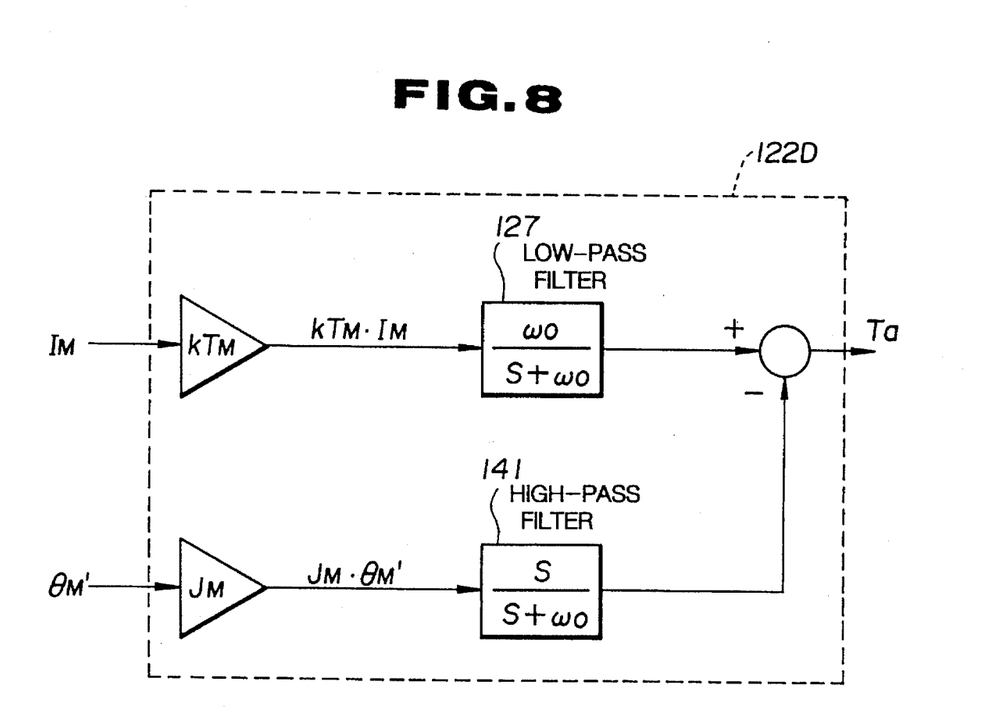
FIG. 8 is a block diagram of a fourth modification of the actual assistive torque detector of the electrically operated power steering apparatus shown in FIG. 3.

FIGS. 7 and 8 show equivalent circuits of respective third and fourth modifications of the actual assistive torque detector 122.

In FIG. 7, an actual assistive torque detector 122C according to the third modification includes a high-pass filter 141, and is equivalent to the actual assistive torque detector 122A shown in FIG. 5(b). An actual assistive torque Ta detected thereby is expressed by the equation (7).

In FIG. 8, an actual assistive torque detector 122D according to the fourth modification includes a high-pass filter 141 and a low-pass filter 127, and is also equivalent to the actual assistive torque detector 122A shown in FIG. 5(b). An actual assistive torque Ta detected thereby is expressed by the equation (7).

The actual assistive torque detectors 122C, 122D shown in FIGS. 7 and 8 are arranged to carry out given calculations while adding $J_{M0}*\Theta_M'$ which is the product of the pseudo-inertial moment $J_{M0}$ and the rotational angular speed $\Theta_M'$ for thereby producing the actual assistive torque Ta according to the equation (9). By modifying the equation (9) into the equation (10) and setting ($J_{M0} - J_M$) = $D_M$ (viscosity coefficient), the actual assistive torque Ta which takes into account the inertial torque and the viscosity torque can be produced as with the actual assistive torque detector 122B shown in FIG. 6(b).

While the Coulomb friction torque $T_f$ in the equation (1) is neglected as being very small, the Coulomb friction torque $T_f$ may be added to the subtractor in the actual assistive torque detector 122B shown in FIG. 6(b) to obtain the same actual assistive torque Ta as that according to the equation (1).

In the third embodiment, the target assistive torque Ts is generated based on the steering torque. However, a target assistive torque component $\Delta Ts$ based on a vehicle speed V, for example, may be added or deduced, or the steering torque T may be corrected with the vehicle speed V, to generate a target assistive torque Ts.

The electrically operated power steering apparatus according to the third embodiment has the actual assistive torque detector for calculating an actual assistive torque which takes into account the inertial torque and the viscosity torque with respect to the motor torque based on the motor current and the rotational angular speed. Therefore, the electrically operated power steering apparatus can produce an optimum assistive steering torque by controlling the electric motor so that the difference between the actual assistive torque and the target assistive torque generated by the target assistive torque generator will be eliminated.

The actual assistive torque detector has a low-pass filter which can equivalently achieve differentiation for conversion from a rotational angular speed into a rotational angular acceleration for thereby reducing noise of harmonics that are generated upon differentiation. Consequently, the inertial torque which can be represented by the product of the inertial moment and the rotational angular acceleration can accurately be calculated.

The actual assistive torque detector may be composed of a high-pass filter or a combination of high- and low-pass filters, and such an actual assistive torque detector is functionally equivalent to the actual assistive torque detector having a low-pass filter.

The electrically operated power steering apparatus is therefore capable of giving the driver a comfortable feel of steering action.

An electrically operated power steering apparatus according to a fourth embodiment of the present invention will be described below with reference to FIG. 10.

Figure 10:
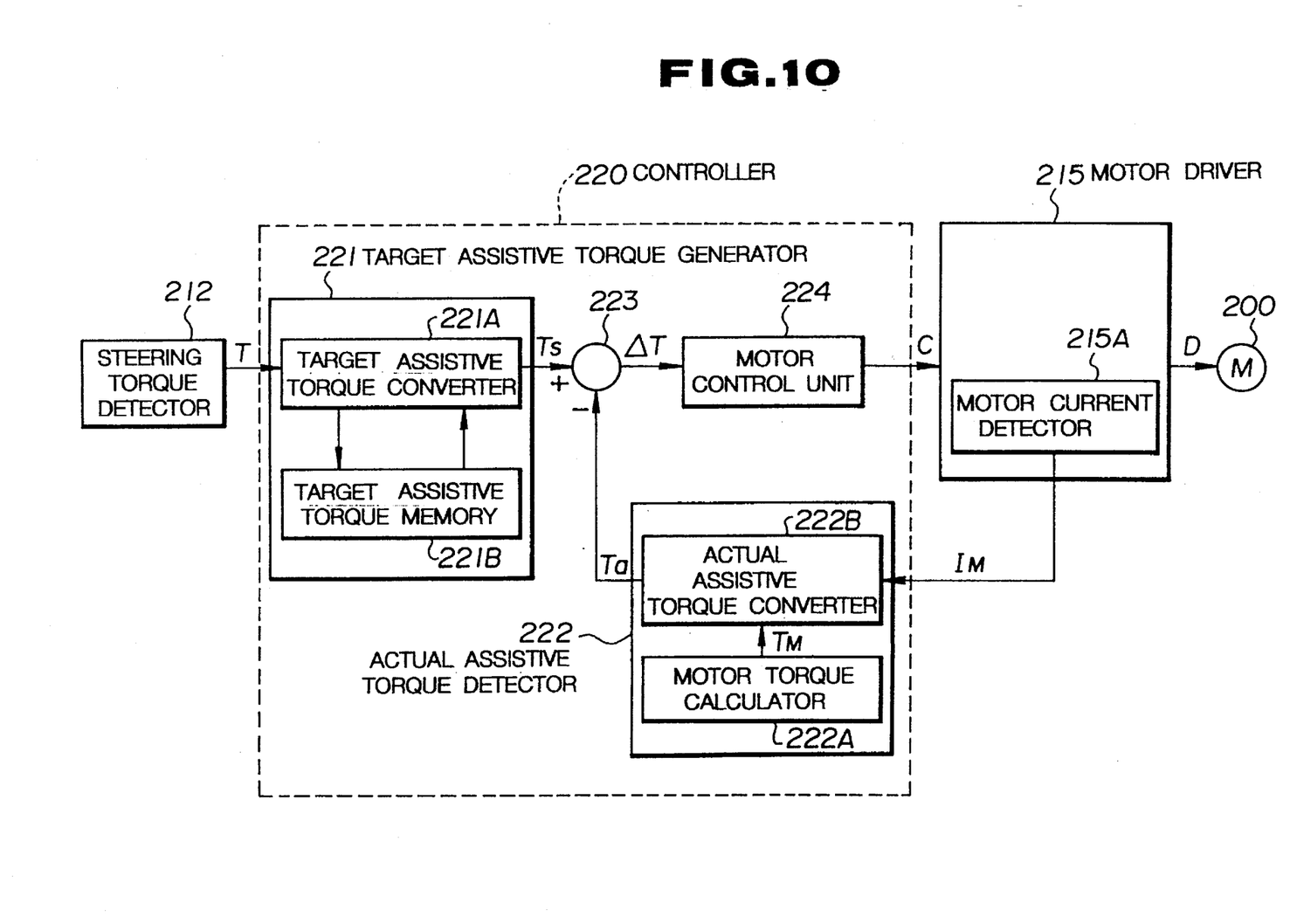
FIG. 10 is a block diagram of a control system of an electrically operated power steering apparatus according to a fourth embodiment of the present invention.

As shown in FIG. 10, a control system of the electrically operated power steering apparatus according to the fourth embodiment includes a steering torque detector 212 which may comprise a torque sensor or the like for detecting a steering torque applied from the steering wheel, a controller 220, a motor driver 215 having a motor current detector 215A, and an electric motor 200.

The controller 220 basically comprises a microprocessor, and includes a target assistive torque generator 221, an actual assistive torque detector 222, a subtractor 223, and a motor control unit 224. The controller 220 generates a target assistive torque signal (Ts) corresponding to a torque signal (T) detected by the steering torque detector 212, and also generates a control signal C based on the generated target assistive torque signal (Ts) and applies the control signal C to the motor driver 215 to enable the motor driver 215 to energize the electric motor 200 for producing a necessary assistive steering torque.

The controller 220 also calculates an actual assistive torque Ta corresponding to the assistive steering torque produced by the electric motor 200 based on a motor current $I_M$ detected by the motor current detector 215A, corrects the control signal C based on the difference ($\Delta T$) between the target assistive torque signal (Ts) and the actual assistive torque signal (Ta), and outputs the corrected control signal C to control the electric motor 200 to equalize the actual assistive torque Ta to the target assistive torque Ts.

The target assistive torque generator 221 comprises a target assistive torque converter 221A and a target assistive torque memory 221B which may be a ROM or the like. The target assistive torque converter 221A converts a steering torque T detected by the steering torque detector 212 into an electric torque signal (T), also converts the torque signal (T) into a target assistive torque signal (Ts) stored in the target assistive torque memory 221B, and outputs the target assistive torque signal (Ts) to the subtractor 223.

The actual assistive torque detector 222 comprises a motor torque calculator 222A and an actual assistive torque converter 222B. The motor torque calculator 222A reads a motor current $I_M$ detected by the motor current detector 215A, converts the motor current $I_M$ into an electric signal, and multiplies the motor current signal by a motor torque constant $kT_M$ stored in a ROM or the like ($KT_M*I_M$) thereby to calculate a motor torque Tm.

The actual assistive torque converter 222B comprises a filter that constitutes a transfer function determined according to equations of motion based on a dynamic model, whose degree of freedom is 2, of the motor and rack systems of the steering system.

The subtractor 223 calculates the difference ($\Delta T=Ts-Ta$) between the target assistive torque signal (Ts) and the actual assistive torque signal (Ta), and outputs the difference signal ($\Delta T$) to the motor control unit 224. In response to the supplied difference signal ($\Delta T$), the motor control unit 224 outputs a control signal C, e.g., a pulse-width-modulated (PWM) signal, to the motor driver 215, which may comprise a bridge circuit composed of four FETs.

The motor driver 215 converts the control signal C into a motor drive current (motor current $I_M$), and outputs a motor drive signal D to energize the electric motor 200.

The motor current detector 215A of the motor driver 215 detects a motor current signal $I_M$, and supplies the motor current signal $I_M$ to the actual assistive torque detector 222.

Figure 11:
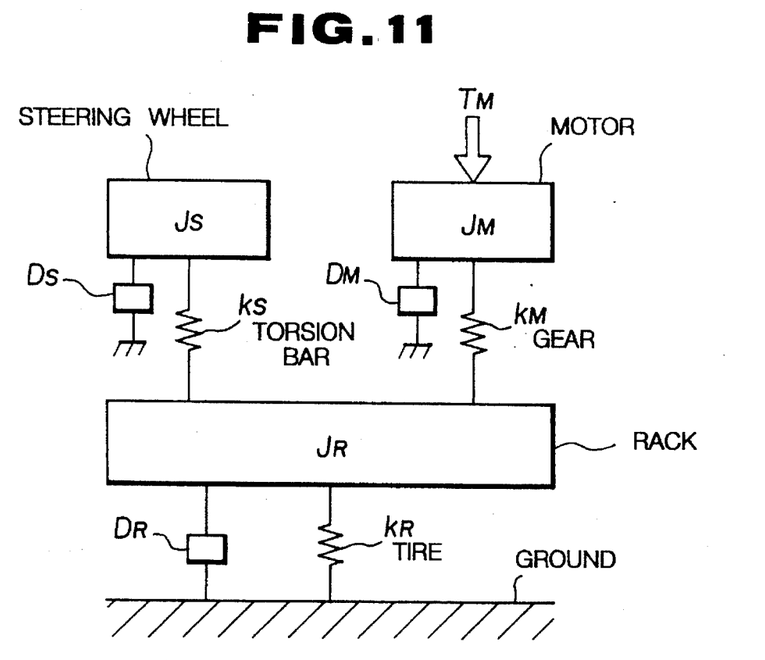
FIG. 11 is a schematic diagram of a dynamic model, with the degree of freedom being 3, of an electrically operated power steering apparatus.

FIG. 11 shows a dynamic model, with the degree of freedom being 3, of an electrically operated power steering apparatus.

In FIG. 11, the dynamic model is composed of a steering wheel system, a motor system, and a rack system, with the degree of freedom being 3. Denoted in FIG. 11 at $J_S$, $J_M$ are the moments of inertia of the steering wheel and the electric motor, $J_R$ the mass of the rack, $k_S$, $k_M$, $k_R$ the spring constants, respectively, of the torsion bar of the steering wheel system, the gears of the motor system, and the tires of the rack system, $D_S$, $D_M$, $D_R$ the damping coefficients, respectively, of the steering wheel system, the motor system, and the rack system, and Tm the motor torque produced by the electric motor.

If the steering wheel is fixed and the rigidity of the tires is ignored in the dynamic model shown in FIG. 11, then there is obtained a dynamic model composed of a motor system and a rack system, with the degree of freedom being 2.

Figure 12:
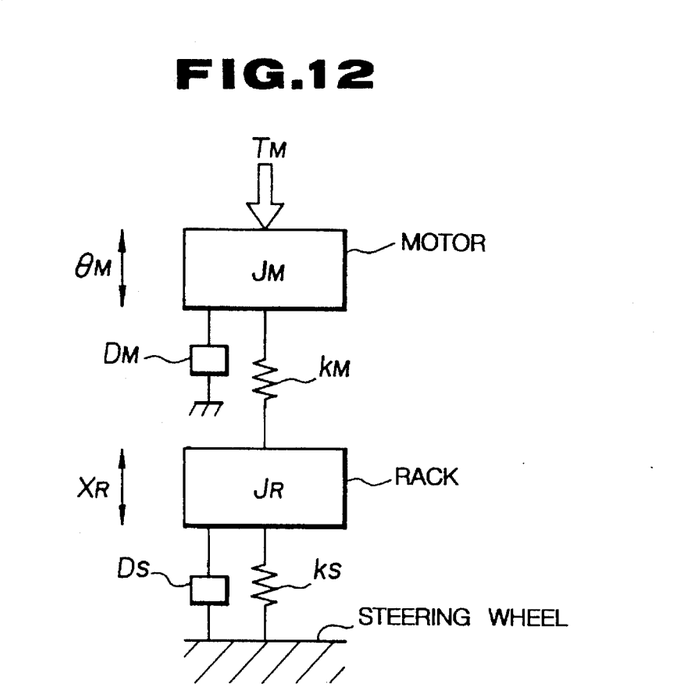
FIG. 12 is a schematic diagram of a dynamic model, with the degree of freedom being 2, of an electric motor system and a rack system in the electrically operated power steering apparatus according to the fourth embodiment of the present invention.

FIG. 12 shows a dynamic model, with the degree of freedom being 2, of a motor system and a rack system in the electrically operated power steering apparatus according to the fourth embodiment of the present invention. In FIG. 12, $\Theta_M$ and $X_r$ represents displacements, respectively, of the motor and rack systems which are produced by the motor torque Tm.

Based on the dynamic model shown in FIG. 12, equations of motion with the displacements $\Theta_M$ and $X_R$ as variables are expressed by the following two linear differential equations (12):

$$J_M*\theta_M''+D_M*\theta_M'+k_M(\theta_M-X_R)=Tm$$

$$J_R*X_R''+D_S*X_R'+k_M(X_R-\theta_M)+k_S*X_R=0 \quad (12).$$

The linear differential equations (12) are Laplace-transformed, and solved for displacements $\theta_M(s)$ and $X_R(s)$ in the s region as follows:

$$\theta_M(s)=Tm(s)*A/(1-k_M*A*B)$$

$$X_R(s)=Tm(s)*A*B/(1-k_M*A*B) \quad (13)$$

where $A=1/(J_M*s^2+D_M*s+k_M)$, and $B=k_M/(J_R*s^2+D_M*s+k_M+k_S)$.

Figure 13:
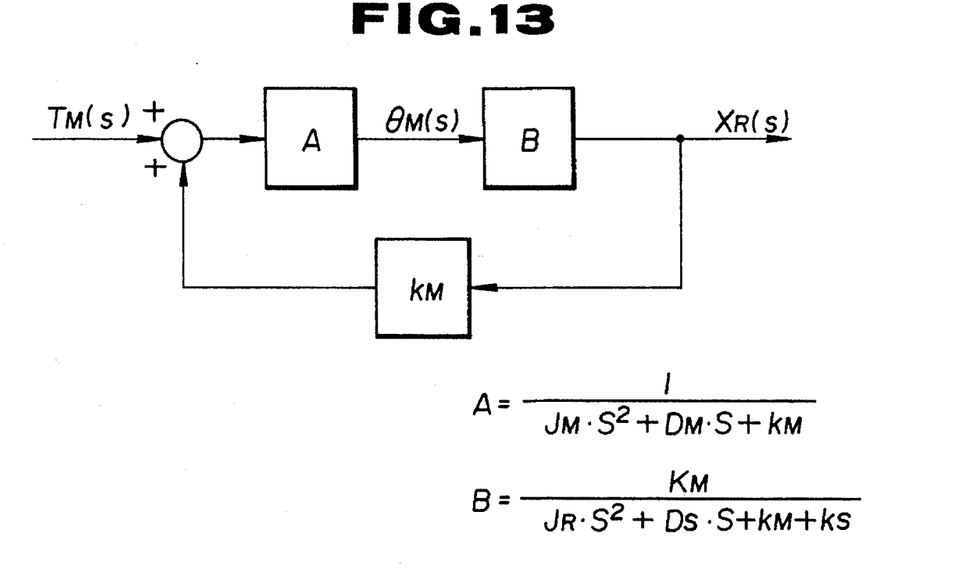
FIG. 13 is a block diagram of a displacement $\Theta_M(s)$ of the electric motor system and a displacement $X_R(s)$ of the rack system at the time the motor torque is applied as an input Tm(s) in the dynamic model shown in FIG. 12.

FIG. 13 shows in block form the displacement $\theta M(s)$ of the motor system and the displacement $X_R(s)$ of the rack system at the time the motor torque is applied as an input Tm(s) in the dynamic model shown in FIG. 12. The system shown in FIG. 13 is constructed based on the equations (13) of the displacements $\theta M(s)$, $X_R(s)$.

From the equation (1) and the first one of the equations (13), an actual assistive torque Ta(s) is determined by multiplying the difference between the displacements $\theta M(s)$ and $X_R(s)$ by the spring constant $k_M$ as indicated by the following equation (14):

$$\begin{aligned}Ta(s) &= k_M\{\Theta M(s)-X_R(s)\} \\ &= Tm(s)*k_M*A*(1-B)/(1-k_M*A*B).\end{aligned} \quad (14)$$

Figure 14:
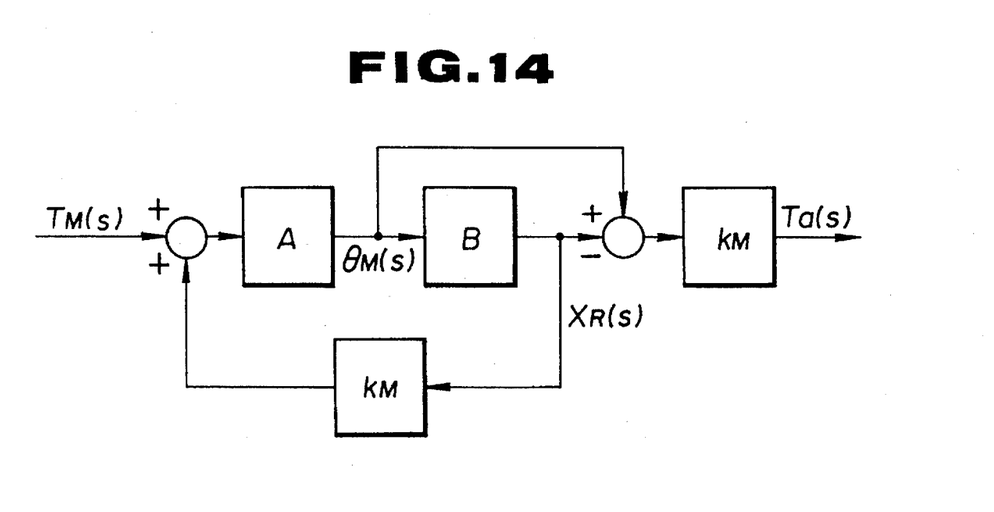
FIG. 14 is a block diagram of an actual assistive torque Ta(s) at the time the motor torque is applied as an input Tm(s) in the dynamic model shown in FIG. 12.

FIG. 14 shows in block form an actual assistive torque Ta(s) at the time the motor torque is applied as an input Tm(s) in the dynamic model shown in FIG. 12. The system shown in FIG. 14 is constructed based on the equation (14) of $k_M\{\theta M(s)-X_R(s)\}$, From the equation (14), a transfer function G(s) shown in FIG. 14 is expressed by the following equation (15):

$$\begin{aligned}G(s) &= Ta(s)/Tm(s) \\ &= k_M*A*(1-B)/(1-k_M*A*B).\end{aligned} \quad (15)$$

Figure 15:
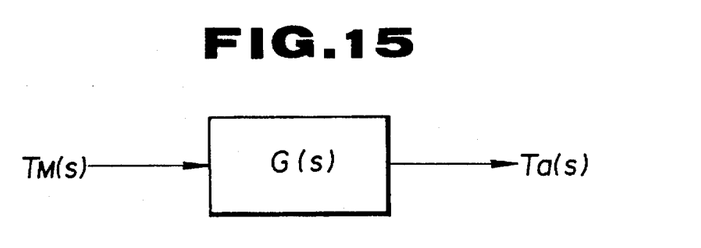
FIG. 15 is a block diagram representative of an equation (15).

FIG. 15 shows a block corresponding to the equation (15).

By thus constructing the actual assistive torque converter 222B of the filter having the transfer function G(s) represented by the equation (15) or shown in FIG. 15, the actual assistive torque Ta can be obtained when the motor torque Tm is applied.

Since the coefficients A, B constitute quadratic functions relative to the Laplace operator s, the transfer function G(s) represented by the equation (15) or shown in FIG. 15 constitutes a quartic function, and hence the filter becomes complex. Therefore, insofar as the response characteristics of the quartic transfer function G(s) can be approximated, the filter is composed of a quadratic transfer function so that it is simplified.

The simplified quadratic transfer function $G_2(s)$ is expressed by the equation (16) given below. By setting the damping coefficient of the quadratic transfer function $G_2(s)$ to 1, the response of the actual assistive torque Ta to the motor torque Tm can be rendered critical, allowing the actual assistive torque Ta to approach a final value in a shortest period of time without overshoot or undershoot.

$$G_2(s)=(a_2s^2+b_2s+c_2)/(s^2+b_1s+c_1) \qquad (16).$$

While the actual assistive torque converter 222B is composed of the filter which produces the transfer function G(s) in the fourth embodiment, the transfer function G(s) may be software-implemented, and any hardware that implements the filter may be dispensed with.

The electrically operated power steering apparatus according to the fourth embodiment has the actual assistive torque detector composed of the motor torque calculator and the actual assistive torque converter, and calculates a motor torque based on a motor current and supplies the calculated motor torque to a filter which realizes a transfer function that is analyzed based on equations of motion established from a dynamic model for thereby obtaining an actual assistive torque.

The filter may be simplified insofar as it can approximate the response characteristics of the transfer function of the original filter.

The electrically operated power steering apparatus which is relatively simple in arrangement can thus produce an actual assistive torque which takes into account the inertial and viscosity torques of the electric motor and the rack.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

We claim:

1. An electrically operated power steering apparatus for use with a steering system of a motor vehicle, comprising:

said steering system for steering the motor vehicle;

steering torque detecting means for detecting a manual steering torque applied to said steering system;

an electric motor for generating an assistive torque to be transmitted as a steering assistive force to said steering system;

actual assistive torque detecting means for detecting an actual assistive steering torque which is actually transmitted from said electric motor to said steering system;

control means comprising a target assistive torque generating means for generating a target value for an assistive torque to be generated by said electric motor depending on the manual steering torque detected by said steering torque detecting means, for generating a control signal based on the difference between the actual assistive steering torque detected by said actual assistive torque detecting means and the target value generated by said target assistive torque generating means; and motor driving means for energizing said electric motor based on said control signal from said control means.

2. An electrically operated power steering apparatus according to claim 1, wherein said actual assistive torque detecting means comprises means for detecting the actual assistive torque in an assistive torque transmission path in said steering system.

3. An electrically operated power steering apparatus for use with a steering system of a motor vehicle, comprising:

said steering system for steering the motor vehicle;

steering torque detecting means for detecting a manual steering torque applied to said steering system;

target assistive torque generating means for generating a target assistive torque signal depending on the manual steering torque detected by said steering torque detecting means;

an electric motor for generating an assistive torque to be transmitted as a steering assistive force to said steering system;

actual assistive torque detecting means for detecting an actual assistive steering torque which is actually transmitted from said electric motor to said steering system based on at least a motor current of said electric motor; and motor driving means for energizing said electric motor based on respective output signals from said target assistive torque generating means and said actual assistive torque detecting means.

4. An electrically operated power steering apparatus according to claim 3, wherein the actual assistive torque which is actually transmitted to said steering system is based on at least a motor torque determined from the motor current and corrected based on at least an inertial resistance of said electric motor.

5. An electrically operated power steering apparatus according to claim 3, wherein the actual assistive torque which is actually transmitted to said steering system is based on at least a motor torque determined from the motor current and corrected based on at least a inertial resistance and a viscosity resistance of said electric motor.

6. An electrically operated power steering apparatus according to claim 3, further comprising:

rotational angular speed detecting means for detecting a rotational angular speed of said electric motor;

said motor driving means comprising motor current detecting means for detecting a motor current of said electric motor;

said actual assistive torque detecting means comprising a processing means for processing a motor current signal representing the motor current detected by said motor current detecting means and a rotational angular speed signal representing the rotational angular speed detected by said rotational angular speed detecting means to produce an actual assistive torque signal representing the actual assistive torque that is actually transmitted to said steering system.

7. An electrically operated power steering apparatus according to claim 6, wherein said actual assistive torque detecting means further comprises:

adding means for adding said motor current signal and said rotational angular speed signal into a sum signal;

a low-pass filter having a predetermined cutoff angular frequency for passing said sum signal therethrough; and subtracting means for subtracting said rotational angular speed signal from an output signal from said low-pass filter to produce said actual assistive torque signal.

8. An electrically operated power steering apparatus according to claim 6, wherein said rotational angular speed detecting means comprises a DC generator.

9. An electrically operated power steering apparatus according to claim 6, wherein said actual assistive torque detecting means further comprises:
- motor torque calculating means for calculating a motor torque corresponding to said motor current signal;
- angular momentum calculating means for calculating an angular momentum corresponding to said rotational angular speed signal;
- adding means for adding a motor torque signal representing the motor torque calculated by said motor torque calculating means and an angular momentum signal representing the angular momentum calculated by said angular momentum calulating means into a sum signal;
- a low-pass filter having a predetermined cutoff angular frequency for passing said sum signal therethrough; and
- subtracting means for subtracting said angular momentum signal from an output signal from said low-pass filter to produce said actual assistive torque signal.

10. An electrically operated power steering apparatus according to claim 6, wherein said actual assistive torque detecting means further comprises:
- motor torque calculating means for calculating a motor torque corresponding to said motor current signal;
- pseudo-angular momentum calculating means for calculating a pseudo-angular momentum corresponding to said rotational angular speed signal;
- angular momentum calculating means for calculating an angular momentum corresponding to said rotational angular speed signal;
- adding means for adding a motor torque signal representing the motor torque calculated by said motor torque calculating means and a pseudo-angular momentum signal representing the pseudo-angular momentum calculated by said pseudo-angular momentum calculating means into a sum signal;
- a low-pass filter having a predetermined cutoff angular frequency for passing said sum signal therethrough; and
- subtracting means for subtracting said angular momentum signal from an output signal from said low-pass filter to produce said actual assistive torque signal.

11. An electrically operated power steering apparatus according to claim 3, further comprising:
- rotational angular speed detecting means for detecting a rotational angular speed of said electric motor;
- said motor driving means comprising motor current detecting means for detecting a motor current of said electric motor;
- said actual assistive torque detecting means comprising at least one of a low-pass filter having a predetermined cutoff angular frequency and a high-pass filter having a predetermined cutoff angular frequency, for producing said actual assistive torque signal based on a motor current signal representing the motor current detected by said motor current detecting means and a rotational angular speed signal representing the rotational angular speed detected by said rotational angular speed detecting means.

12. An electrically operated power steering apparatus according to claim 3, wherein said motor driving means further comprises motor current detecting means for detecting a motor current of said electric motor, and wherein said actual assistive torque detecting means comprises motor torque calculating means for calculating a motor torque based on said motor current and assistive torque converting means for converting said motor torque into an actual assistive torque.

13. An electrically operated power steering apparatus according to claim 12, wherein said actual assistive torque detecting means further comprises filter means having a transfer function calculated based on equations of motion of a dynamic model composed of a motor system and a rack system, with the degree of freedom thereof being 2.

14. An electrically operated power steering apparatus according to claim 13, wherein said actual assistive torque detecting means further comprises filter means approximated by a quadratic transfer function if the calculated transfer function is of higher degree.

15. An electrically operated power steering apparatus in a motor vehicle, comprising:
- a steering system for steering the motor vehicle, said steering system comprising a steering wheel, a pinion coupled to said steering wheel, a rack shaft having rack teeth meshing with said pinion, and a steerable wheel operatively coupled to said rack shaft;
- steering torque detecting means for detecting a manual steering torque applied to said steering wheel;
- an electric motor for generating an assistive torque to be transmitted as a steering assistive force to said rack shaft;
- an actual assistive torque detecting means for detecting an actual assistive steering torque which is actually transmitted from said electric motor to said rack shaft;
- control means having at least target assistive torque generating means for generating a target value for an assistive torque to be generated by said electric motor depending on the manual steering torque detected by said steering torque detecting means, for generating a control signal based on the difference between the actual assistive steering torque detected by said actual assistive torque detecting means and the target value generated by said target assistive torque generating means; and
- motor driving means for energizing said electric motor based on said control signal from said control means.

* * * * *